(12) United States Patent
Takizawa et al.

(10) Patent No.: US 11,156,816 B2
(45) Date of Patent: *Oct. 26, 2021

(54) REFLECTIVE SPATIAL LIGHT MODULATOR HAVING NON-CONDUCTING ADHESIVE MATERIAL, OPTICAL OBSERVATION DEVICE AND OPTICAL IRRADIATION DEVICE

(71) Applicant: HAMAMATSU PHOTONICS K.K., Hamamatsu (JP)

(72) Inventors: Kuniharu Takizawa, Hamamatsu (JP); Hiroshi Tanaka, Hamamatsu (JP); Haruyoshi Toyoda, Hamamatsu (JP); Yasushi Ohbayashi, Hamamatsu (JP); Hiroto Sakai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/307,511

(22) PCT Filed: Jun. 5, 2017

(86) PCT No.: PCT/JP2017/020871
§ 371 (c)(1),
(2) Date: Dec. 6, 2018

(87) PCT Pub. No.: WO2017/213100
PCT Pub. Date: Dec. 14, 2017

(65) Prior Publication Data
US 2019/0196164 A1 Jun. 27, 2019

(30) Foreign Application Priority Data
Jun. 6, 2016 (JP) .............................. JP2016-112854

(51) Int. Cl.
*G02B 21/00* (2006.01)
*G02F 1/03* (2006.01)
*H04N 5/225* (2006.01)

(52) U.S. Cl.
CPC ......... *G02B 21/0032* (2013.01); *G02B 21/00* (2013.01); *G02F 1/03* (2013.01); *H04N 5/2258* (2013.01)

(58) Field of Classification Search
CPC ............ C01P 2002/34; G02B 21/0032; G02B 21/0076; G02B 21/06; G02B 21/36;
(Continued)

(56) References Cited

U.S. PATENT DOCUMENTS

| | | |
|---|---|---|
| 3,938,878 A | 2/1976 | Fox |
| 5,221,989 A | 6/1993 | Stappaerts et al. |

(Continued)

FOREIGN PATENT DOCUMENTS

| | | |
|---|---|---|
| CN | 1825579 A | 8/2006 |
| CN | 101281301 A | 10/2008 |

(Continued)

OTHER PUBLICATIONS

English translation of Kawai et al., JP 2014-219495 A (cited in the IDS of Dec. 6, 2018) (Year: 2014).*

(Continued)

*Primary Examiner* — Ryan S Dunning
(74) *Attorney, Agent, or Firm* — Faegre Drinker Biddle & Reath LLP (57) ABSTRACT

A reflective spatial light modulator includes a perovskite-type electro-optic crystal having a relative permittivity of 1,000 or higher and including an input surface to which the input light is input and a rear surface which faces the input surface; a light input and output unit disposed on the input surface of the electro-optic crystal and including a first (Continued)

electrode through which the input light is transmitted; a light reflecting unit including a pixel electrode portion including a plurality of second electrodes and an adhesion layer fixing the pixel electrode portion to the rear surface, is disposed on the rear surface of the electro-optic crystal, and reflects the input light toward the input and output unit; and a drive circuit for applying an electric field between the first electrode and the plurality of second electrodes. The adhesion layer includes a dielectric material in a cured material of a non-conducting adhesive material.

11 Claims, 7 Drawing Sheets (58) Field of Classification Search
CPC ............ G02B 21/361; G02B 2207/113; G02F 1/0018; G02F 1/03–0558; G02F 2202/32; G02F 2203/12; H04N 5/2258
USPC .................. 359/11, 298, 315–323, 385–390
See application file for complete search history.

(56) References Cited

U.S. PATENT DOCUMENTS

| | | | |
|---|---|---|---|
| 5,291,314 | A | 3/1994 | Agranat et al. |
| 5,497,258 | A | 3/1996 | Ju et al. |
| 6,211,991 | B1* | 4/2001 | Bryan .................. G02F 1/1341 |
| | | | 156/230 |
| 6,525,867 | B1 | 2/2003 | Oakley et al. |
| 6,950,584 | B1 | 9/2005 | Suzuki |
| 2003/0197273 | A1 | 10/2003 | Dennison et al. |
| 2004/0008397 | A1 | 1/2004 | Noonan |
| 2005/0152024 | A1 | 7/2005 | Awaya et al. |
| 2006/0070715 | A1 | 4/2006 | Connors, Jr. et al. |
| 2010/0001371 | A1 | 1/2010 | Suzuki et al. |
| 2010/0166464 | A1 | 7/2010 | Cho |
| 2010/0244632 | A1 | 9/2010 | Maekawa et al. |
| 2011/0170160 | A1 | 7/2011 | Park et al. |
| 2011/0255148 | A1* | 10/2011 | Ohta ..................... G02F 1/0305 |
| | | | 359/320 |
| 2013/0057953 | A1 | 3/2013 | Yokoi |
| 2018/0276843 | A1 | 9/2018 | Send et al. |
| 2020/0292856 | A1* | 9/2020 | Takizawa ........... G01N 21/6458 |
| 2020/0326564 | A1* | 10/2020 | Takizawa ............. G02F 1/0327 |

FOREIGN PATENT DOCUMENTS

| | | |
|---|---|---|
| CN | 101316790 A | 12/2008 |
| CN | 102096206 A | 6/2011 |
| CN | 103605217 A | 2/2014 |
| CN | 105527733 A | 4/2016 |
| JP | S53-3841 A | 1/1978 |
| JP | S63-038916 A | 2/1988 |
| JP | H5-224165 A | 9/1993 |
| JP | H09-502813 A | 3/1997 |
| JP | 2005-234541 A | 9/2005 |
| JP | 2006-65037 A | 3/2006 |
| JP | 2010-19630 A | 1/2010 |
| JP | 2010-224003 A | 10/2010 |
| JP | 2014-89340 A | 5/2014 |
| JP | 2014-89341 A | 5/2014 |
| JP | 2014-202786 A | 10/2014 |
| JP | 2014-219495 A | 11/2014 |
| JP | 2015-158531 A | 9/2015 |
| WO | WO-95/06272 A1 | 3/1995 |
| WO | WO 2006/007071 A1 | 1/2006 |

OTHER PUBLICATIONS

International Preliminary Report on Patentability dated Dec. 20, 2018 for PCT/JP2017/020871.

International Preliminary Report on Patentability dated Dec. 20, 2018 for PCT/JP2017/020873.

International Preliminary Report on Patentability dated Dec. 20, 2018 for PCT/JP2017/020869.

International Preliminary Report on Patentability dated Dec. 20, 2018 for PCT/JP2017/020870.

* cited by examiner

REFLECTIVE SPATIAL LIGHT MODULATOR HAVING NON-CONDUCTING ADHESIVE MATERIAL, OPTICAL OBSERVATION DEVICE AND OPTICAL IRRADIATION DEVICE

TECHNICAL FIELD

The present disclosure relates to a reflective spatial light modulator, an optical observation device, and an optical irradiation device.

BACKGROUND ART

For example, Patent Literature 1 and Patent Literature 2 disclose electro-optical elements. These electro-optical elements include a substrate, a KTN ($KTa_{1-x}Nb_xO_3$) layer that is constituted of a ferroelectric substance laminated on the substrate, a transparent electrode that is disposed on a front surface of the KTN layer, and a metal electrode that is disposed on a rear surface of the KTN layer. KTN adopts four crystal structures depending on the temperature and is utilized as an electro-optical element when having a perovskite-type crystal structure. Such a KTN layer is formed on a seed layer which is formed on a metal electrode.

CITATION LIST

Patent Literature

[Patent Literature 1] Japanese Unexamined Patent Publication No. 2014-89340
[Patent Literature 2] Japanese Unexamined Patent Publication No. 2014-89341

SUMMARY OF INVENTION

Technical Problem

In Patent Literature 1 and Patent Literature 2, conductivity is applied to a seed layer by adding a conductive substance to the seed layer. In this case, a metal electrode and a KTN layer are electrically connected to each other, so that an electric field can be applied to the KTN layer. However, for example, when a plurality of metal electrodes of an electro-optical device is formed in an array shape, there is concern that if conductivity is applied to the seed layer, electrical signals input to the plurality of metal electrodes may be mixed together so that modulation accuracy becomes unstable.

An object of an embodiment is to provide a reflective spatial light modulator, an optical irradiation device, and an optical observation device, in which electrical signals input to a plurality of electrodes are prevented from being mixed together, and the modulation accuracy is stable.

Solution to Problem

According to an aspect, there is provided a reflective spatial light modulator for modulating input light and outputting modulated light that has been subjected to modulation. The reflective spatial light modulator includes a perovskite-type electro-optic crystal having a relative permittivity of 1,000 or higher and including an input surface to which the input light is input and a rear surface which faces the input surface; a light input and output unit disposed on the input surface of the electro-optic crystal and including a first electrode through which the input light is transmitted; a light reflecting unit including a pixel electrode portion including a plurality of second electrodes and an adhesion layer fixing the pixel electrode portion to the rear surface, is disposed on the rear surface of the electro-optic crystal, and reflects the input light toward the input and output unit; and a drive circuit for applying an electric field between the first electrode and the plurality of second electrodes. The adhesion layer includes a dielectric material in a cured material of a non-conducting adhesive material.

In addition, according to another aspect, there is provided an optical observation device including a light source for outputting the input light, the reflective spatial light modulator described above, an optical system for irradiating a target with modulated light output from the spatial light modulator, and a light detector for detecting light output from the target.

In addition, according to another aspect, there is provided an optical irradiation device including a light source for outputting the input light, the reflective spatial light modulator described above, and an optical system for irradiating a target with modulated light output from the spatial light modulator.

According to the reflective spatial light modulator, the optical irradiation device, and the optical observation device described above, input light is transmitted through the first electrode of the light input and output unit and is input to the input surface of the electro-optic crystal. This input light is reflected by the light reflecting unit disposed on the rear surface of the electro-optic crystal and can be output from the light input and output unit. In this case, an electrical signal is input to a part between the first electrode provided in the light input and output unit and the plurality of second electrodes provided in the pixel electrode portion. Consequently, an electric field is applied to the electro-optic crystal having a high relative permittivity, and input light is modulated. In this reflective spatial light modulator, the plurality of second electrodes is fixed to the rear surface with the adhesion layer including a non-conducting adhesive material and a dielectric material interposed therebetween. In this manner, since the adhesion layer is a non-conducting layer, it is difficult for an electrical signal input to each of the plurality of second electrodes to spread in the adhesion layer. Therefore, electrical signals input to a plurality of electrodes are prevented from being mixed together, and the modulation accuracy is stable.

In addition, according to the aspect, the light input and output unit may further include a transparent substrate having a first surface to which the input light is input and a second surface which is a surface on the opposite side of the first surface. The first electrode may be disposed on the second surface of the transparent substrate. In such a spatial light modulator, even if the thickness of the electro-optic crystal in the direction of the optical axis is thin, the electro-optic crystal is protected from an external shock or the like by the transparent substrate.

In addition, according to the aspect, when the relative permittivity of the electro-optic crystal is $\varepsilon_{xtl}$, a thickness from the input surface to the rear surface in the electro-optic crystal is $d_{xtl}$, a thickness of the adhesion layer is $d_{ad}$, and a value of $V_{xtl}N_{smax}$ that is a ratio of $V_{xtl}$, which is a voltage applied to the electro-optic crystal for performing phase modulation or retardation modulation of input light by $2\pi$ radians, to $V_{smax}$ which is a maximum voltage for an applied voltage generated by the drive circuit is $R_s$, a relative permittivity $\varepsilon_{ad}$ of the adhesion layer including the dielectric material may be expressed by Expression 1. In this case, it is possible to apply a sufficient voltage to the electro-optic crystal to perform phase modulation or retardation modulation of input light by $2\pi$ radians.

[Math. 1]

$$\varepsilon_{ad} > \left(\frac{\varepsilon_{xtl} \cdot R_s}{d_{xtl} \cdot (1 - R_s)}\right) \cdot d_{ad} \quad (1)$$

In addition, according to the aspect, the first electrode may be formed over the entire input surface. For example, when a plurality of first electrodes is provided to respectively correspond to the plurality of second electrodes, it is difficult for the first electrodes and the second electrodes to be positionally aligned. In the above configuration, there is no need to perform positional alignment of first electrodes and second electrodes.

In addition, according to the aspect, the light reflecting unit may further include a plurality of third electrodes which is disposed on the rear surface of the electro-optic crystal to face the plurality of second electrodes. According to this configuration, an electrical signal transmitted as an electric force line is prevented from spreading using the plurality of third electrodes.

In addition, according to the aspect, the input light may be reflected by the plurality of third electrodes in the light reflecting unit. Moreover, according to the aspect, the input light may be reflected by the plurality of second electrodes in the light reflecting unit. According to these configurations, there is no need to separately provide a reflecting layer or the like on the second electrode side.

In addition, according to the aspect, the electro-optic crystal may be a crystal of $(KTa_{1-x}Nb_xO_3)(0 \leq x \leq 1)$, a crystal of $K_{1-y}Li_yTa_{1-x}Nb_xO_3$ ($0 \leq x \leq 1$ and $0 < y < 1$), or a PLZT crystal. According to this configuration, an electro-optic crystal having a high relative permittivity can be easily realized.

In addition, the aspect may further include a temperature control element configured to control the temperature of the electro-optic crystal. According to this configuration, the modulation accuracy is more stable due to a uniformly maintained temperature for the electro-optic crystal.

Effects of Invention

According to the reflective spatial light modulator, the optical irradiation device, and the optical observation device of the embodiments, electrical signals input to a plurality of electrodes are prevented from being mixed together, and the modulation accuracy is stable.

DESCRIPTION OF EMBODIMENTS

Hereinafter, embodiments will be described in detail with reference to the drawings. For convenience, there are cases in which the same reference signs are applied to substantially the same elements and description thereof is omitted.

First Embodiment

Figure 1:
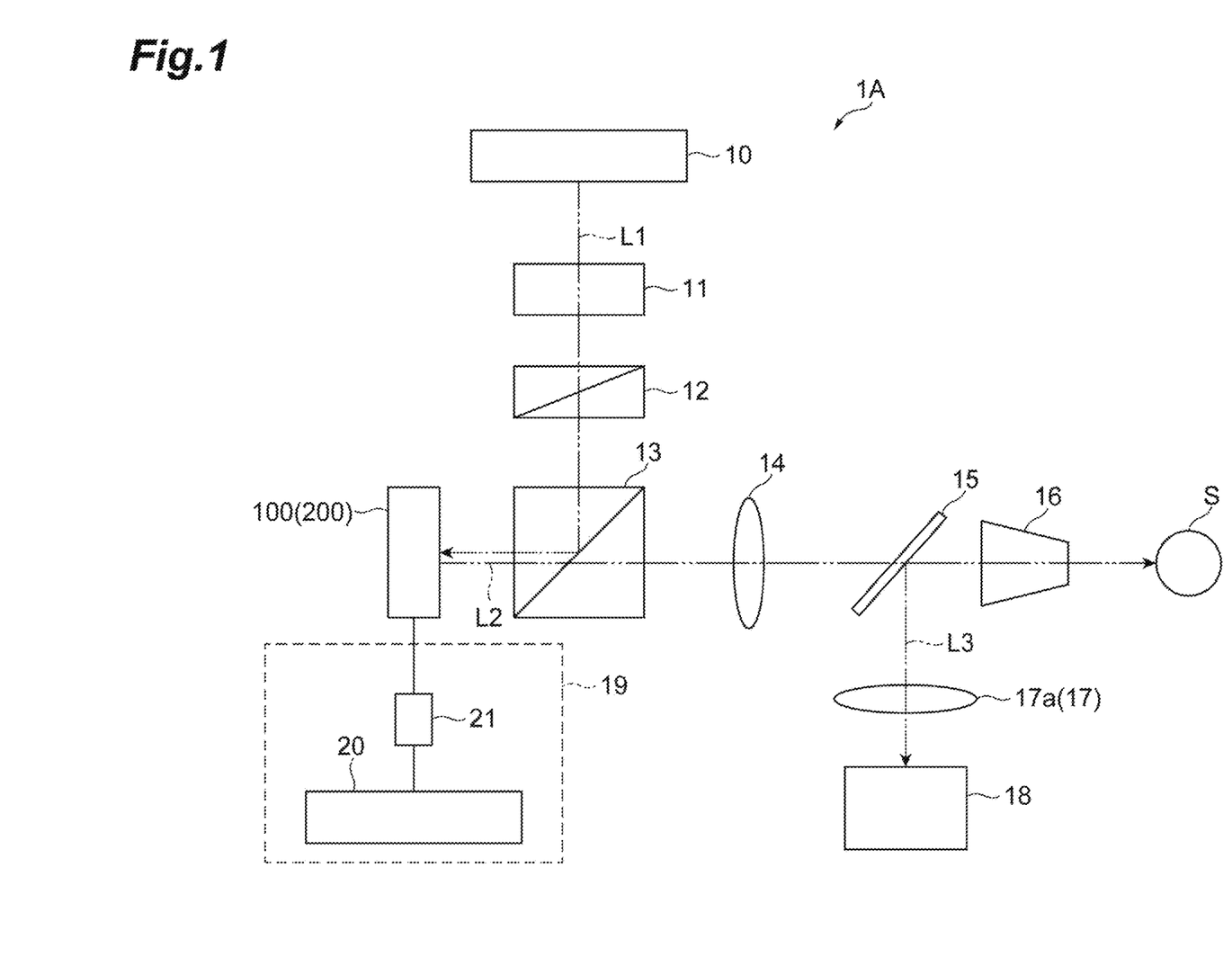
FIG. 1 is a block diagram illustrating a configuration of an optical observation device according to an embodiment.

FIG. 1 is a block diagram illustrating a configuration of an optical observation device according to an embodiment. For example, an optical observation device 1A is a fluorescence microscope for capturing an image of an observation target. The optical observation device 1A irradiates a surface of a specimen (target) S with input light L1 and captures an image of detection light L3 such as fluorescence or reflected light output from the specimen S in response to the irradiation, thereby acquiring an image of the specimen S.

For example, the specimen S, which becomes an observation target, is a sample such as a cell or an organism containing a fluorescent material such as a fluorescent pigment or fluorescent protein. In addition, the specimen S may be a sample such as a semiconductor device or a film. When the specimen S is irradiated with light having a predetermined wavelength region (excitation light or illumination light), the specimen S emits the detection light L3 such as fluorescence, for example. For example, the specimen S is accommodated inside a holder having transparency with respect to at least the input light L1 and the detection light L3. For example, this holder is held on a stage.

As illustrated in FIG. 1, the optical observation device 1A includes a light source 10, a collimator lens 11, a polarizer 12, a polarization beam splitter 13, a spatial light modulator 100, a first optical system 14, a beam splitter 15, an object lens 16, a second optical system 17, a light detector 18, and a control unit 19.

The light source 10 outputs the input light L1 having a wavelength at which the specimen S is excited. For example, the light source 10 emits coherent light or incoherent light. Examples of a coherent light source include a laser light source such as a laser diode (LD). Examples of an incoherent light source include a light emitting diode (LED), a super-luminescent diode, (SLD) and a lamp-based light source.

The collimator lens 11 collimates the input light L1 output from the light source 10 and outputs the collimated input light L1. The input light L1 is selectively transmitted through polarizer 12 in accordance with polarization components. For example, S-wave light of the input light L1 is transmitted through the polarizer 12. The polarization beam splitter 13 reflects the input light L1, which has been transmitted through the polarizer 12, toward the spatial light modulator 100. The spatial light modulator 100 is a spatial light modulator which performs phase modulation or retardation modulation of the input light L1 output from the light source 10. The spatial light modulator 100 modulates the input light L1 input from the collimator lens 11 and outputs modulated light L2 that has been subjected to modulation toward the polarization beam splitter 13. At this time, the spatial light modulator 100 rotates a polarization surface for the input light L1 90 degrees and outputs the modulated light L2. Therefore, the modulated light L2 output from the spatial light modulator 100 is transmitted through the polarization beam splitter 13 and is guided to the first optical system 14. The spatial light modulator 100 in the present embodiment is constituted as a reflective spatial light modulator. The spatial light modulator 100 is electrically connected to a controller 21 of the control unit 19 and constitutes a spatial light modulation unit. Driving of the spatial light modulator 100 is controlled by the controller 21 of control unit 19. The spatial light modulator 100 will be described below in detail. As functions of the spatial light modulator 100, (1) the position of an irradiation spot may be limited, (2) the position of the irradiation spot may be moved, (3) a plurality of irradiation spots may be formed at the same time, and (4) the phase of irradiation light may be controlled.

The first optical system 14 optically couples the spatial light modulator 100 and the object lens 16 to each other. Accordingly, the modulated light L2 output from the spatial light modulator 100 is guided to the object lens 16. For example, the first optical system 14 is a lens, which concentrates the modulated light L2 from the spatial light modulator 100 by a pupil of the object lens 16.

The beam splitter 15 is an optical element for separating the modulated light L2 and the detection light L3 from each other. For example, the beam splitter 15 is configured to allow the modulated light L2 having an excitation wavelength to be transmitted, and to reflect the detection light L3 having a fluorescence wavelength. In addition, the beam splitter 15 may be a polarization beam splitter or a dichroic mirror. Depending on the optical systems on the front and rear sides (for example, the first optical system 14 and the second optical system 17) of the beam splitter 15 or the type of the microscope to be applied, the beam splitter 15 may be configured to reflect the modulated light L2 and to allow the detection light L3 having a fluorescence wavelength to be transmitted.

The object lens 16 concentrates the modulated light L2 that has been subjected to modulation by the spatial light modulator 100, irradiates the specimen S with the concentrated light, and guides the detection light L3 emitted from the specimen S in response to the irradiation. For example, the object lens 16 is configured to be movable along an optical axis by a drive element such as a piezoelectric actuator or a stepping motor. Accordingly, a concentration position of the modulated light L2 and a focal position for detecting the detection light L3 can be adjusted.

The second optical system 17 optically couples the object lens 16 and the light detector 18 to each other. Accordingly, the light detector 18 forms an image of the detection light L3 guided from the object lens 16. The second optical system 17 has a lens 17a which forms an image of the detection light L3 from the object lens 16 on a light receiving surface of the light detector 18.

The light detector 18 captures an image of the detection light L3 which has been guided by the object lens 16 and formed on the light receiving surface as an image. For example, the light detector 18 is an area image sensor such as a CCD image sensor or a CMOS image sensor.

The control unit 19 includes a computer 20 having a control circuit (processor), an image processing circuit (processor), a memory, and the like; and the controller 21 having a control circuit (processor), a memory, and the like and being electrically connected to the spatial light modulator 100 and the computer 20. For example, the computer 20 is a personal computer, a smart device, a microcomputer, a cloud server, or the like. The computer 20 makes the processor to control operations of the object lens 16, the light detector 18, and the like and executes various types of control. In addition, the controller 21 controls the phase modulation amount or the retardation modulation amount in the spatial light modulator 100.

Figure 2:
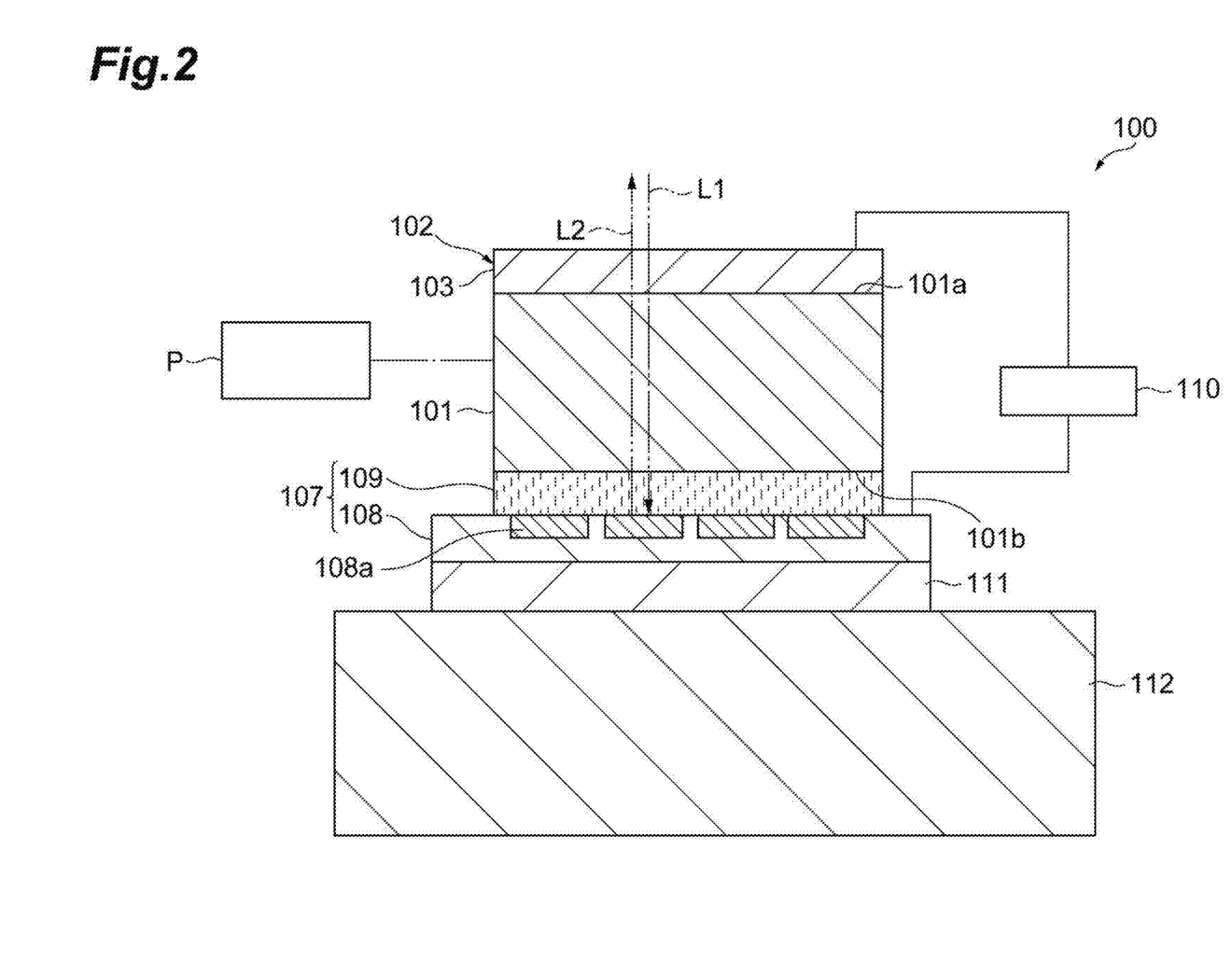
FIG. 2 is a cross-sectional view illustrating a spatial light modulator used in the optical observation device in FIG. 1.

Next, the spatial light modulator 100 will be described in detail. FIG. 2 is a cross-sectional view illustrating a spatial light modulator. The spatial light modulator 100 is a reflective spatial light modulator which modulates the input light L1 and outputs the modulated light L2 that has been subjected to modulation. As illustrated in FIG. 2, the spatial light modulator 100 includes an electro-optic crystal 101, a light input and output unit 102, a light reflecting unit 107, and a drive circuit 110.

Figure 4:
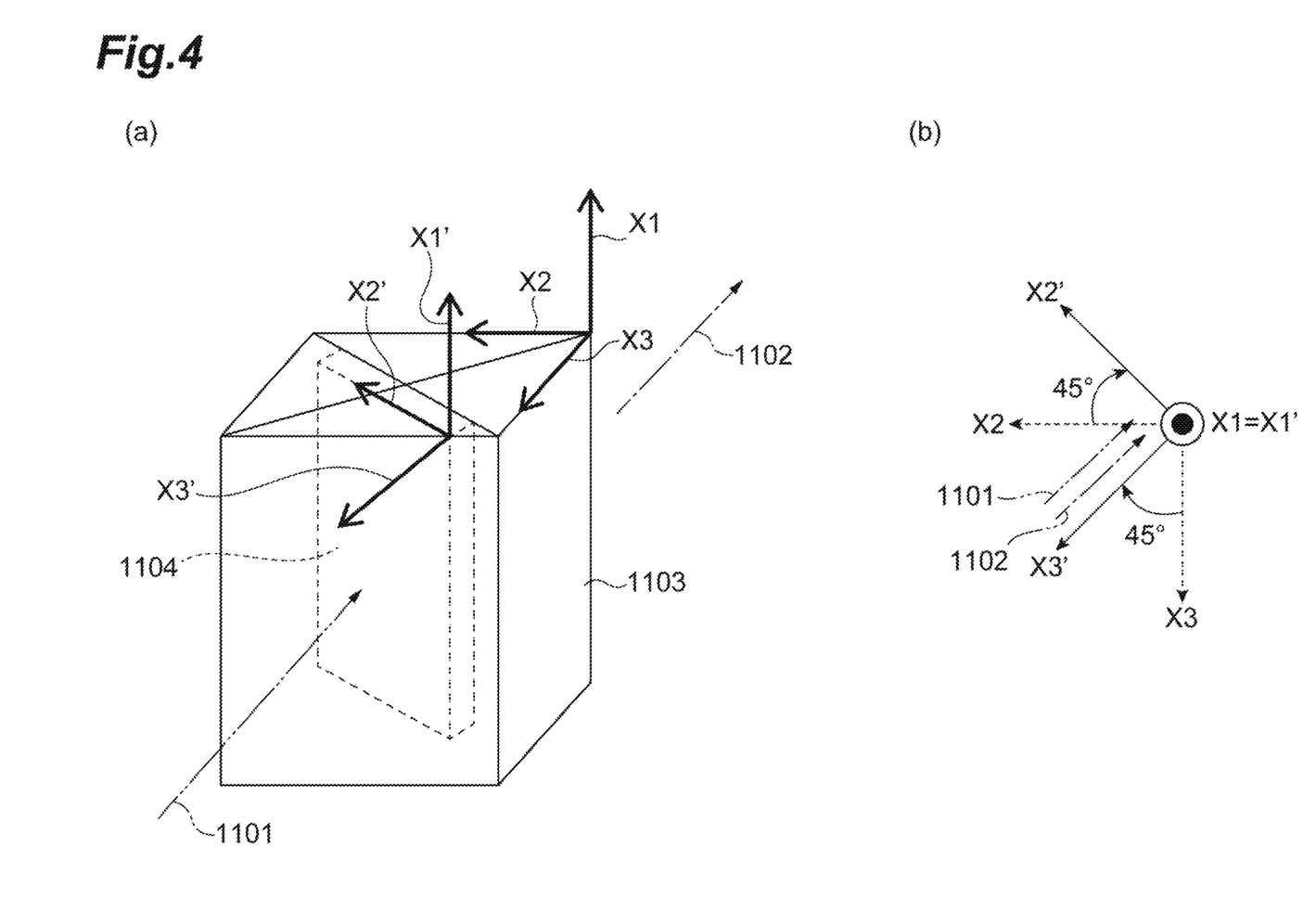
FIG. 4 is a view illustrating a relationship among crystal axes, a traveling direction of light, and an electric field in retardation modulation.

The electro-optic crystal 101 has a plate shape including an input surface 101a to which the input light L1 is input, and a rear surface 101b which faces the input surface 101a. The electro-optic crystal 101 has a perovskite-type crystal structure utilizing an electro-optical effect such as a Pockels effect and a Kerr effect for variation of the refractive index. The electro-optic crystal 101 having a perovskite-type crystal structure is an isotropic crystal which belongs to a point group m3m of a cubic system and has a relative permittivity of 1,000 or higher. For example, the relative permittivity of the electro-optic crystal 101 may have a value ranging from approximately 1,000 to 20,000. Examples of such an electro-optic crystal 101 include a crystal of $KTa_{1-x}Nb_xO_3$ ($0 \le x \le 1$) (will hereinafter be referred to as a "KTN crystal"), a crystal of $K_{1-y}Li_yTa_{1-x}Nb_xO_3$ ($0 \le x \le 1$ and $0 < y < 1$), and a PLZT crystal. Specifically, examples thereof include $BaTiO_3$, $K_3Pb_3(Zn_2Nb_7)O_{27}$, $K(Ta_{0.65}Nb_{0.35})P_3$, $Pb_3MgNb_2O_9$, and $Pb_3NiNb_2O_9$. In the spatial light modulator 100 of the present embodiment, a KTN crystal is used as the electro-optic crystal 101. Since a KTN crystal is in the point group m3m of the cubic system, the KTN crystal has no Pockels effect and performs modulation due to the Kerr effect. Therefore, since light is input in a manner of being parallel or perpendicular to a crystal axis of the electro-optic crystal 101, phase modulation can be performed by applying an electric field in the same direction. In addition, retardation modulation can be performed by rotating two arbitrary crystal axes about the remaining axis at an arbitrary angle other than 0° and 90°. FIG. 4(a) is a perspective view illustrating a relationship among the crystal axes, a traveling direction of light, and an electric field in retardation modulation. FIG. 4(b) is a plan view illustrating each of the axes. The example in FIG. 4 illustrates a case in which a crystal is rotated at an angle of 45°. When axes X2 and X3 are rotated 45° about an axis X1 and new axes X1, X2', and X3' are set, retardation modulation can be performed by inputting light in a manner of being parallel or perpendicular to these new axes. In FIG. 4, an electric field is applied in an applying direction 1102 of a crystal 1104. A propagation direction 1101 of the input light L1 becomes parallel to the applying direction 1102 of the electric field. In this case, Kerr coefficients used for modulating the input light L1 are g11, g12, and g44.

The relative permittivity of a KTN crystal is likely affected by the temperature. For example, the relative permittivity is a maximum at approximately 20,000 at a temperature near −5° C., and the relative permittivity decreases to approximately 5,000 at a normal temperature close to 20° C. Therefore, for example, the temperature of the electro-optic crystal 101 is controlled such that it is a temperature near −5° C. by a temperature control element P such as a Peltier element.

The light input and output unit 102 has a first electrode 103 which is disposed on the input surface 101a of the electro-optic crystal 101. For example, the first electrode 103 is a transparent electrode formed of ITO (indium tin oxide) and allows the input light L1 to be transmitted through. In the present embodiment, the first electrode 103 is formed over the entire input surface 101a. For example, the first electrode 103 may be formed by depositing ITO on the input surface 101a of the electro-optic crystal 101. The input light L1 is transmitted through the first electrode 103 and is input to the inside of the electro-optic crystal 101.

Figure 3:
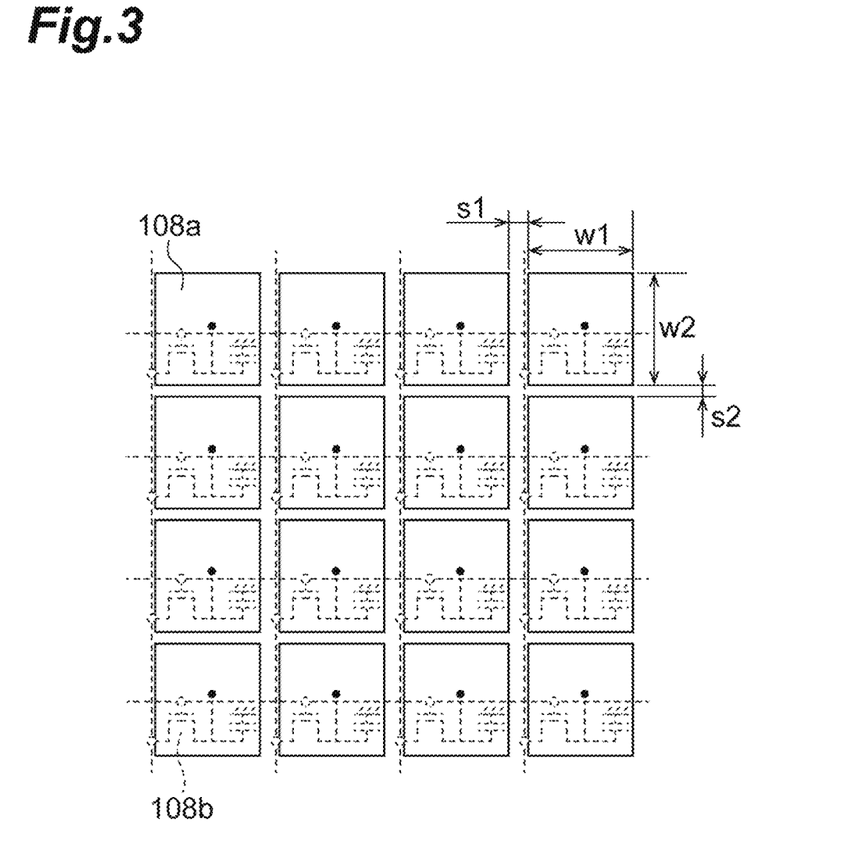
FIG. 3 is a view for describing electrodes of the spatial light modulator in FIG. 2.

The light reflecting unit 107 is disposed on the rear surface 101b of the electro-optic crystal 101 and reflects the modulated light L2 toward the input and output unit. This light reflecting unit 107 includes a CMOS substrate (pixel electrode portion) 108 and an adhesion layer 109. The CMOS substrate 108 is fixed to a substrate 112 such as an organic substrate, for example, a glass epoxy (epoxy resin having a glass fiber sheet as a core material) substrate, a ceramic substrate, and the like, with an adhesion layer 111 interposed therebetween. The CMOS substrate 108 includes second electrodes 108a which a plurality of pixel electrodes facing the rear surface 101b of the electro-optic crystal 101. The second electrodes 108a may reflect the input light L1, which is propagated inside the electro-optic crystal 101, toward the light input and output unit 102. For example, the second electrodes 108a are forming of a material such as a metal (for example, aluminum). As illustrated in FIG. 3, in the light reflecting unit 107 according to the present embodiment, a plurality of second electrodes 108a formed to have a rectangular shape in a plan view are disposed in a two-dimensional manner. For example, a length W1 of the second electrode 108a in a lateral direction and a length W2 thereof in a vertical direction can be formed to be the same length. Second electrodes 108a adjacent to each other are disposed with a space S1 or S2 therebetween. FIGS. 2 and 3 schematically illustrate the spatial light modulator 100. In order to simplify the description, the diagrams illustrate an example in which the second electrodes 108a are disposed in a 4×4 array. The CMOS substrate 108 may function as a drive circuit which applies an electric field between the first electrode 103 and the second electrodes 108a.

Driving switches 108b are provided in the plurality of corresponding second electrodes 108a. Each of the second electrodes 108a may be controlled at an arbitrary voltage by these switches 108b.

The adhesion layer 109 fixes the CMOS substrate 108 to the rear surface 101b. This adhesion layer 109 includes a dielectric material in a cured material of a non-conducting adhesive material and includes no conductive material. The term "non-conducting" is not limited to properties of having no conductivity and includes highly insulating properties and properties of having high electrical resistivity. That is, the adhesion layer 109 has highly insulating properties (high electrical resistivity) and ideally has no conductivity. For example, an adhesive material may be formed of an optically colorless transparent resin such as an epoxy-based adhesive. For example, the dielectric material may have a relative permittivity approximately the same as that of the electro-optic crystal 101. The dielectric material may be powder having a particle size equal to or smaller than the wavelength of the input light L1. For example, the dielectric material may have a particle size ranging from approximately 50 nm to 3,000 nm. Light can be prevented from scattering by reducing the particle size of the dielectric material. The dielectric material may be powder of the electro-optic crystal 101.

The drive circuit 110 is electrically connected to the first electrode 103 and is connected to the CMOS substrate 108, thereby being electrically connected to each of the plurality of second electrodes 108a. Such a drive circuit 110 is controlled by the control unit 19. The drive circuit 110 inputs an electrical signal to a part between the first electrode 103 and the second electrodes 108a. Accordingly, an electric field is applied to the electro-optic crystal 101 and the adhesion layer 109 disposed between the first electrode 103 and the second electrodes 108a. In this case, a voltage applied by the drive circuit 110 is distributed to the electro-optic crystal 101 and the adhesion layer 109. Therefore, when the relative permittivity of the electro-optic crystal 101 is $\varepsilon_{xtl}$, the thickness from the input surface 101a to the rear surface 101b in the electro-optic crystal 101 is $d_{xtl}$, the relative permittivity of the adhesion layer 109 is $\varepsilon_{ad}$, and the thickness of the adhesion layer 109 is $d_{ad}$, a voltage ratio R of a voltage applied to the electro-optic crystal 101 to a voltage applied between the first electrode 103 and the second electrodes 108a can be expressed by the following Expression (2).

[Math. 2]

$$R = \frac{\varepsilon_{ad} \cdot d_{xtl}}{(\varepsilon_{xtl} \cdot d_{ad} + \varepsilon_{ad} \cdot d_{xtl})} \quad (2)$$

In this manner, a voltage applied to the electro-optic crystal 101 depends on the relative permittivity $\varepsilon_{ad}$ and the thickness $d_{ad}$ of the adhesion layer 109. For example, the spatial light modulator 100 according to the present embodiment has modulation performance of outputting the modulated light L2 obtained by modulating the input light L1 by one wavelength. In this case, the relative permittivity $\varepsilon_{ad}$ of the adhesion layer 109 is obtained as follows. First, the upper limit for a voltage applied to the CMOS substrate 108 by the drive circuit 110 is determined, in order to avoid breakdown of a CMOS circuit. Here, the maximum voltage for an applied voltage generated by the drive circuit 110 is referred to as $V_{smax}$. In addition, a voltage applied to the electro-optic crystal 101 for performing phase modulation of the input light L1 by $2\pi$ radians is referred to as $V_{xtl}$. In this case, when the value of $V_{xtl}/V_{smax}$, which is a voltage ratio of $V_{xtl}$ to $V_{smax}$, is $R_s$, the voltage ratio R and the voltage ratio $R_s$ need to satisfy the relationship of the following Expression (3). In this case, it is possible to apply a sufficient voltage to the electro-optic crystal 101 to perform phase modulation of the input light L1 by $2\pi$ radians.

$$R_s < R \quad (3)$$

Then, based on Expression (2) and Expression (3), the relative permittivity $\varepsilon_{ad}$ and the thickness $d_{ad}$ of the adhesion layer 109 satisfy the following Expression (4).

[Math. 3]

$$R_s < \frac{\varepsilon_{ad} \cdot d_{xtl}}{(\varepsilon_{xtl} \cdot d_{ad} + \varepsilon_{ad} \cdot d_{xtl})} \quad (4)$$

Based on this Expression (4), the relative permittivity of the adhesion layer 109 is obtained. That is, when Expression (4) is transformed to an expression for the relative permittivity of the adhesion layer 109, the following Expression (1) is derived.

[Math. 4]

$$\varepsilon_{ad} > \left( \frac{\varepsilon_{xtl} \cdot R_s}{d_{xtl} \cdot (1 - R_s)} \right) \cdot d_{ad} \qquad (1)$$

When the relative permittivity of the adhesion layer 109 satisfies Expression (1), a sufficient electric field is applied to an electro-optic crystal to perform modulation of the input light L1 by one wavelength.

According to the spatial light modulator 100 described above, the input light L1 is transmitted through the first electrode 103 of the light input and output unit 102 and is input to the input surface 101a of the electro-optic crystal 101. This input light L1 is reflected by the light reflecting unit 107 disposed on the rear surface 101b of the electro-optic crystal 101 and is output from the light input and output unit 102. In this case, an electrical signal is input to a part between the first electrode 103 provided in the light input and output unit 102 and the plurality of second electrodes 108a provided in the CMOS substrate 108. Consequently, an electric field is applied to the electro-optic crystal 101 having a high relative permittivity, so that the input light L1 is modulated. In this spatial light modulator 100, the plurality of second electrodes 108a is fixed to the rear surface 101b with the adhesion layer 109 which includes a non-conducting adhesive material and a dielectric material and is interposed between the plurality of second electrodes 108a and the rear surface 101b. In this manner, since the adhesion layer 109 is a non-conducting layer, it is difficult for an electrical signal input to each of the plurality of second electrodes 108a to spread in the adhesion layer 109. Therefore, input electrical signals are prevented from being mixed together, and the modulation accuracy is stable.

In addition, according to the aspect, the first electrode 103 is formed over the entire input surface 101a. For example, when a plurality of first electrodes 103 is provided to respectively correspond to the plurality of second electrodes 108a, the first electrode 103 and the second electrodes 108a are unlikely to be positionally aligned with each other. In the above configuration, there is no need for the first electrode 103 and the second electrodes 108a to be positionally aligned with each other.

In addition, according to the aspect, in the light reflecting unit 107, since the input light L1 is reflected by the plurality of second electrodes 108a, there is no need to separately provide a reflecting layer or the like on the second electrode 108a side.

In addition, due to the configuration including the temperature control element P that controls the temperature of the electro-optic crystal 101, a uniform temperature for the electro-optic crystal 101 is maintained. Accordingly, the modulation accuracy is more stable. The temperature control element P may perform temperature control with respect to not only the electro-optic crystal 101 but also the entirety of the spatial light modulator 100 including the CMOS substrate 108 and the like.

Second Embodiment

Figure 5:
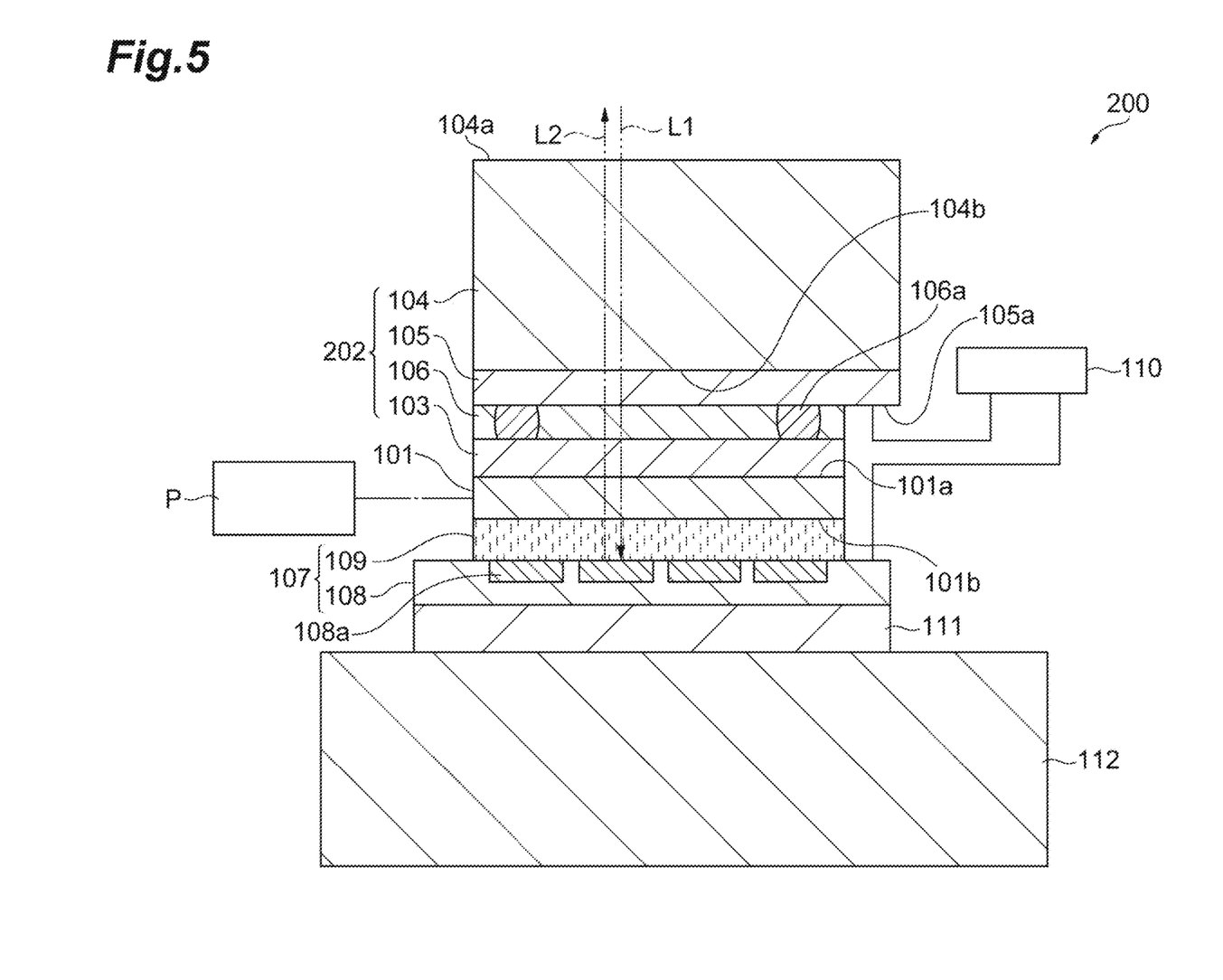
FIG. 5 is a cross-sectional view illustrating a spatial light modulator according to another embodiment.

A spatial light modulator 200 according to the present embodiment differs from the spatial light modulator 100 of the first embodiment in the configuration of supporting the electro-optic crystal 101 by a transparent substrate 104. Hereinafter, differences between the present embodiment and the first embodiment will be mainly described. The same reference signs are applied to the same elements or members, and detailed description thereof will be omitted.

FIG. 5 is a cross-sectional view illustrating the spatial light modulator 200 according to the present embodiment. As illustrated in FIG. 5, the reflective spatial light modulator 200 includes the electro-optic crystal 101, a light input and output unit 202, the light reflecting unit 107, and the drive circuit 110. The CMOS substrate 108 constituting the light reflecting unit 107 is fixed to the substrate 112. In the present embodiment, the thickness of the electro-optic crystal 101 in an optical axis direction may be 50 μm or smaller, for example.

The light input and output unit 202 has the first electrode 103, the transparent substrate 104, a transparent electrode 105, and an adhesion layer 106. For example, the transparent substrate 104 is formed of a material such as glass, quartz, or plastic in a flat plate shape. The transparent substrate 104 has a first surface 104a to which the input light L1 is input, and a second surface 104b which is a surface on the opposite side of the first surface 104a and faces the input surface 101a of the electro-optic crystal 101. The transparent electrode 105 is an electrode formed over the entire second surface 104b of the transparent substrate 104 and allows the input light L1 to be transmitted through. For example, the transparent electrode 105 is formed by depositing ITO on the second surface 104b of the transparent substrate 104.

The adhesion layer 106 causes the first electrode 103 formed in the electro-optic crystal 101 and the transparent electrode 105 formed in the transparent substrate 104 to adhere to each other. For example, the adhesion layer 106 is formed of an epoxy-based adhesive and allows the input light L1 to be transmitted through. For example, a metal sphere-like conductive member 106a is disposed inside the adhesion layer 106. The conductive member 106a is in contact with both the first electrode 103 and the transparent electrode 105 and electrically connects the first electrode 103 and the transparent electrode 105 to each other. For example, the conductive member 106a is disposed at four corners of the adhesion layer 106 in a plan view.

In the present embodiment, the size of the transparent substrate 104 on the second surface 104b side in a plan view is formed to be larger than that of the input surface 101a of the electro-optic crystal 101. Therefore, in a state in which the electro-optic crystal 101 is supported by the transparent substrate 104, a portion of the transparent electrode 105 formed in the transparent substrate 104 becomes an exposed portion 105a exposed to the outside. The drive circuit 110 is electrically connected to the exposed portion 105a and the CMOS substrate 108. That is, the drive circuit 110 is electrically connected to the first electrode 103 with the transparent electrode 105 and the conductive member 106a interposed therebetween. Consequently, the drive circuit 110 can apply an electric field between the first electrode 103 and the second electrodes 108a.

In such a spatial light modulator 200, phase modulation or retardation modulation may be more favorably performed by forming the electro-optic crystal 101 having a small thickness in the optical axis direction. When the electro-optic crystal 101 is formed to be thin in this manner, there is concern that the electro-optic crystal 101 may be damaged due to an external shock or the like. In the present embodiment, since the input surface 101a side of the electro-optic crystal 101 is supported by the transparent substrate 104, the electro-optic crystal 101 is protected from an external shock or the like.

Third Embodiment

Figure 6:
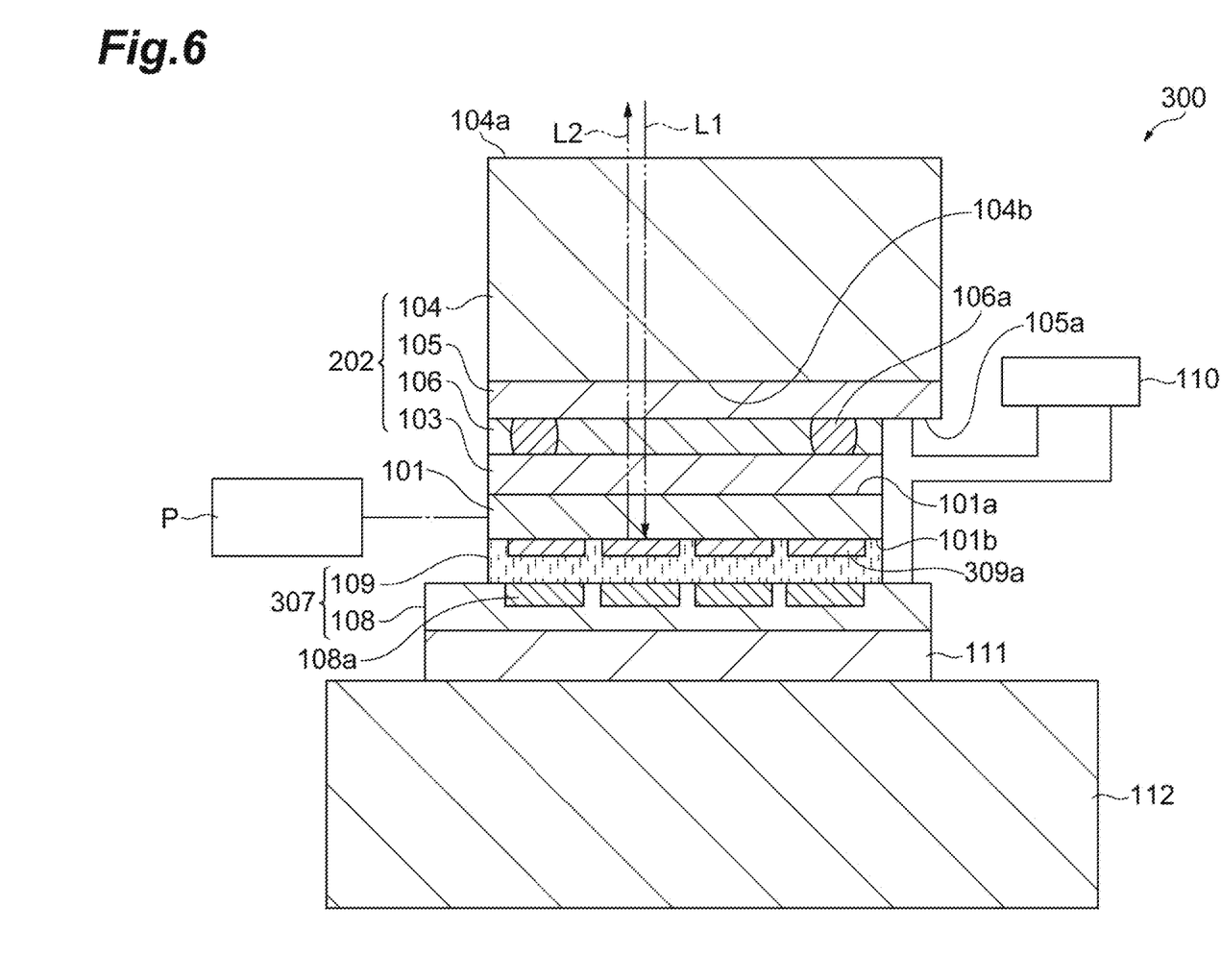
FIG. 6 is a cross-sectional view illustrating a spatial light modulator according to another embodiment.

A spatial light modulator 300 according to the present embodiment differs from the spatial light modulator 200 of the second embodiment in that a light reflecting unit 307 has auxiliary electrodes (third electrodes) 309a. Hereinafter, differences between the present embodiment and the second embodiment will be mainly described. The same reference signs are applied to the same elements or members, and detailed description thereof will be omitted.

FIG. 6 is a cross-sectional view illustrating the spatial light modulator 300 according to the present embodiment. As illustrated in FIG. 6, the reflective spatial light modulator 300 includes the electro-optic crystal 101, the light input and output unit 202, the light reflecting unit 307, and the drive circuit 110.

the light reflecting unit 307 includes the CMOS substrate 108, the adhesion layer 109 and the auxiliary electrodes 309a. The CMOS substrate 108 is fixed to the substrate 112. A plurality of auxiliary electrodes 309a is disposed on the rear surface 101b of the electro-optic crystal 101. The auxiliary electrodes 309a function as mirrors reflecting the input light L1, which is propagated inside the electro-optic crystal 101, toward the light input and output unit 102. For example, the auxiliary electrodes 309a are metal electrodes and may be formed of aluminum or the like. Similar to the second electrodes 108a formed in the CMOS substrate 108, the auxiliary electrodes 309a are disposed in a two-dimensional manner. That is, the auxiliary electrodes 309a and the second electrodes 108a face each other in one-to-one.

The plurality of auxiliary electrodes 309a is formed on the rear surface 101b side of the electro-optic crystal 101 to face the plurality of second electrodes 108a. The auxiliary electrodes 309a are positioned in an electrostatic field formed by the first electrode 103 and the second electrodes 108a on the input surface 101a side of the electro-optic crystal 101. Therefore, due to electrostatic induction, an electrostatic field is generated between the first electrode 103 and the auxiliary electrodes 309a, and between the auxiliary electrodes 309a and the second electrodes 108a. That is, the auxiliary electrodes 309a function as electrostatic lenses in which an electrical signal transmitted as an electric force line is prevented from spreading. Accordingly, in the adhesion layer 109 and the electro-optic crystal 101, spreading of an electrical signal (that is, an electric force line) input from the drive circuit 110 can be significantly prevented. Therefore, input electrical signals can be further prevented from being mixed together, so that the modulation accuracy can be stable with higher resolution.

Hereinabove, the embodiments have been described in detail with reference to the drawings. However, the specific configuration is not limited to these embodiments.

Figure 7:
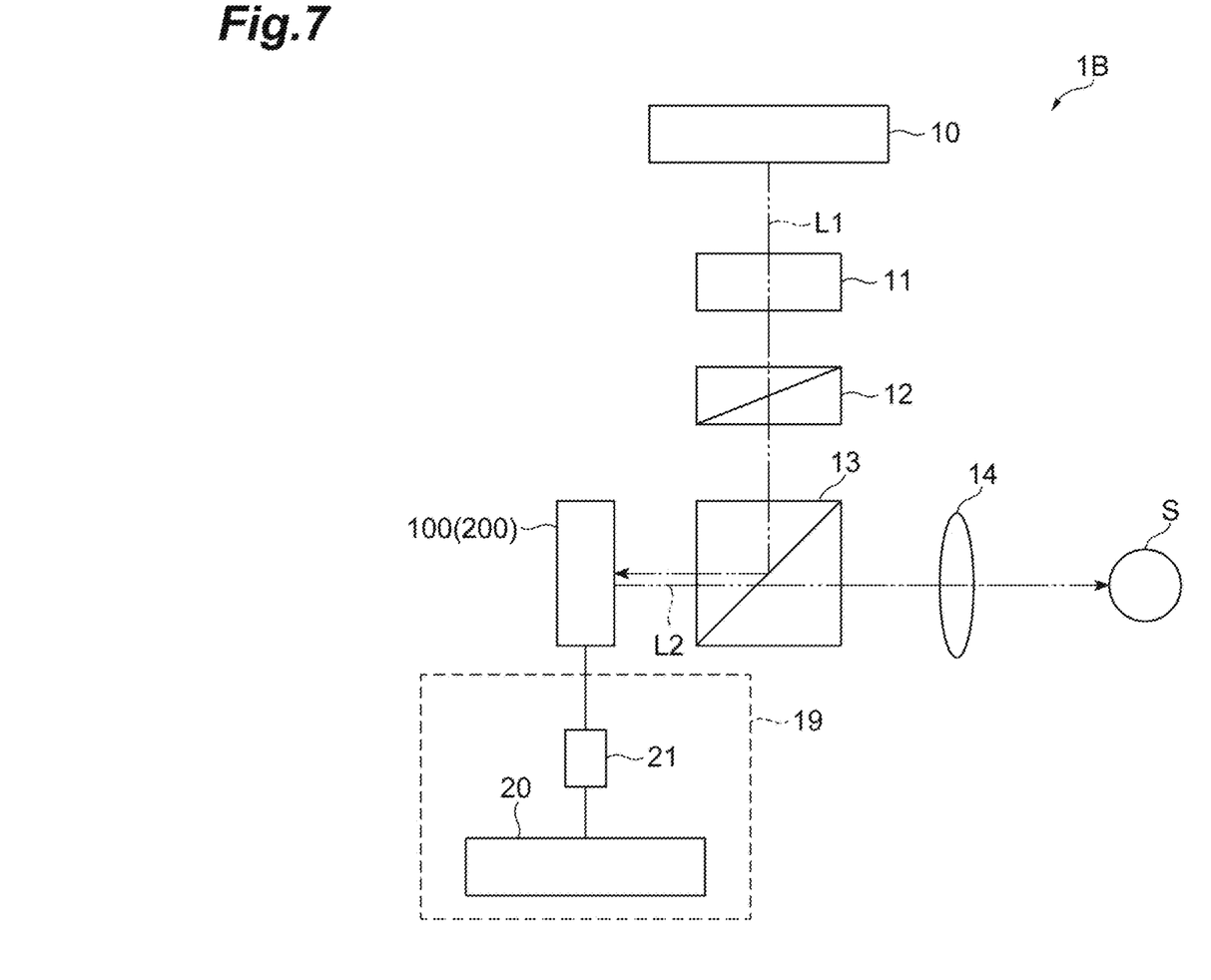
FIG. 7 is a block diagram illustrating a configuration of an optical irradiation device according to another embodiment.

For example, the above embodiment has illustrated an example of an optical observation device 1A including a spatial light modulator. However, the embodiment is not limited thereto. For example, the spatial light modulator 100 may be mounted in an optical irradiation device 1B. FIG. 7 is a block diagram illustrating a configuration of an optical irradiation device. The optical irradiation device 1B has the light source 10, the collimator lens 11, the polarizer 12, the polarization beam splitter 13, the spatial light modulator 100, the first optical system 14, and a control unit 19 that includes the computer 20 and the controller 21. In this configuration, the specimen S is irradiated by the first optical system 14 with the modulated light L2 output from the spatial light modulator 100. As functions of the spatial light modulator 100, (1) the position of an irradiation spot can be limited, (2) the position of the irradiation spot can be moved, (3) a plurality of irradiation spots can be formed at the same time, and (4) the phase of irradiation light can be controlled.

In addition, the third embodiment has illustrated the configuration in which the auxiliary electrodes 309a formed of a metal reflect the input light L1. However, the embodiment is not limited thereto. For example, the auxiliary electrodes 309a may be transparent electrodes. For example, the auxiliary electrodes 309a may be formed of a transparent film such as ITO. In this case, the input light L1 can be transmitted through the auxiliary electrodes and can be reflected by the second electrodes 108a.

REFERENCE SIGNS LIST

1A Optical observation device
1B Optical irradiation device
100 Spatial light modulator (reflective spatial light modulator)
101 Electro-optic crystal
101a Input surface
101b Rear surface
102 Light input and output unit
103 First electrode
107 Light reflecting unit
108 CMOS substrate (pixel electrode portion)
108a Second electrode
109 Adhesion layer
110 Drive circuit
309a Auxiliary electrode (third electrode)
L1 Input light
L2 Modulated light

The invention claimed is:

1. A reflective spatial light modulator for modulating input light and outputting modulated light that has been subjected to modulation, the reflective spatial light modulator comprising:
a perovskite-type electro-optic crystal having a relative permittivity of 1,000 or higher and including an input surface to which the input light is input and a rear surface which faces the input surface;
a light input and output unit disposed on the input surface of the electro-optic crystal and including a first electrode through which the input light is transmitted;
a light reflecting unit including a pixel electrode portion including a plurality of second electrodes and an adhesion layer fixing the pixel electrode portion to the rear surface, is disposed on the rear surface of the electro-optic crystal, and reflects the input light toward the light input and output unit; and
a drive circuit configured to apply an electric field between the first electrode and the plurality of second electrodes,
wherein the adhesion layer includes a cured material of a non-conducting adhesive material and a dielectric material provided in the cured material as powder.

2. The reflective spatial light modulator according to claim 1,
wherein the light input and output unit further includes a transparent substrate having a first surface to which the input light is input and a second surface which is a surface on an opposite side of the first surface, and
wherein the first electrode is disposed on the second surface of the transparent substrate.

3. The reflective spatial light modulator according to claim 1,
wherein when the relative permittivity of the electro-optic crystal is $\varepsilon_{xtl}$, a thickness from the input surface to the rear surface in the electro-optic crystal is $d_{xtl}$, a thickness of the adhesion layer is $d_{ad}$, and a value of $V_{xtl}/V_{smax}$ that is a ratio of $V_{xtl}$, which is a voltage applied to the electro-optic crystal for outputting the modulated light obtained by modulating a phase of input light by $2\pi$ radians, to $V_{smax}$ which is a maximum voltage for an applied voltage generated by the drive circuit is $R_s$, a relative permittivity $\varepsilon_{ad}$ of the adhesion layer including the dielectric material is expressed by Expression (1)

[Math. 1]

$$\varepsilon_{ad} > \left( \frac{\varepsilon_{xtl} \cdot R_s}{d_{xtl} \cdot (1 - R_s)} \right) \cdot d_{ad}. \quad (1)$$

4. The reflective spatial light modulator according to claim 1,
wherein the first electrode is formed over the entire input surface.

5. The reflective spatial light modulator according to claim 1,
wherein the light reflecting unit further includes a plurality of third electrodes which is disposed on the rear surface of the electro-optic crystal to face the plurality of second electrodes.

6. The reflective spatial light modulator according to claim 5,
wherein the input light is reflected by the plurality of third electrodes in the light reflecting unit.

7. The reflective spatial light modulator according to claim 1,
wherein in the light reflecting unit, the input light is reflected by the plurality of second electrodes.

8. The reflective spatial light modulator according to claim 1,
wherein the electro-optic crystal is a crystal of $KTa_{1-x}Nb_xO_3$ ($0 \leq x \leq 1$), a crystal of $K_{1-y}Li_yTa_{1-x}Nb_xO_3$ ($0 \leq x \leq 1$ and $0 < y < 1$), or a PLZT crystal.

9. The reflective spatial light modulator according to claim 1, further comprising:
a temperature control element configured to control a temperature of the electro-optic crystal.

10. An optical observation device comprising:
a light source configured to output the input light;
the reflective spatial light modulator according to claim 1;
an optical system configured to irradiate a target with modulated light output from the reflective spatial light modulator; and
a light detector configured to detect light output from the target.

11. An optical irradiation device comprising:
a light source configured to output the input light;
the reflective spatial light modulator according to claim 1; and
an optical system configured to irradiate a target with modulated light output from the reflective spatial light modulator.

* * * * *